United States Patent [19]

Takahashi et al.

[11] Patent Number: 5,124,814
[45] Date of Patent: Jun. 23, 1992

[54] VIDEO TAPE RECORDER WITH AN INTEGRATED CAMERA

[75] Inventors: Kimihide Takahashi; Katsuya Inana; Yoshiaki Nakayama, all of Tokyo, Japan

[73] Assignee: Fuji Photo Film Co., Ltd., Minami-ashigara, Japan

[21] Appl. No.: 363,070

[22] Filed: Jun. 8, 1989

[30] Foreign Application Priority Data

Jun. 11, 1988 [JP] Japan ............... 63-142794

[51] Int. Cl.$^5$ .................................... H04N 5/76
[52] U.S. Cl. ..................... 358/906; 358/335; 358/341; 358/343
[58] Field of Search ............ 358/310, 335, 906, 909, 358/183, 22, 209, 182, 341, 343; 360/19.1, 14.1

[56] References Cited

U.S. PATENT DOCUMENTS

| | | | |
|---|---|---|---|
| 4,524,381 | 6/1985 | Konishi | 358/335 |
| 4,613,906 | 9/1986 | Tanaka et al. | 358/183 |
| 4,731,677 | 3/1988 | Mino et al. | 358/906 |
| 4,746,993 | 5/1988 | Tada | 358/335 |
| 4,755,885 | 7/1988 | Okino et al. | 358/906 |
| 4,807,051 | 2/1989 | Ogura | 358/335 |
| 4,858,012 | 8/1989 | Hino et al. | 360/14.1 |
| 4,893,198 | 1/1990 | Little | 358/311 |

Primary Examiner—Roy N. Envall, Jr.
Assistant Examiner—Thai Tran

[57] ABSTRACT

A video tape recorder includes an integrated camera. There is a title image data storage for storing a plurality of title image data items and audio data storage for storing audio data items associated with the titles. In response to a title indication supplied from the operator, this apparatus reads out title image data and audio data from the respective storage so as to record or to produce these data items together with a video signal obtained through an imaging operation. A title and a voice can be effectively inserted in a shooting operation.

10 Claims, 3 Drawing Sheets

VIDEO TAPE RECORDER WITH AN INTEGRATED CAMERA

BACKGROUND OF THE INVENTION

1. Field of the Invention

The present invention relates to a video tape recorder, with a camera integrated therein and a video camera. In particular, the invention relates to a video tape recorder with a camera integrated therein and a video camera each capable of recording a predetermined title and a voice associated therewith on a recording medium when an object is shot.

2. Description of the Prior Art

In a VTR with an integrated camera, it has been a common practice that when an object is shot, a title associated with a scene thereof or a date is superimposed onto a screen so that the title or the date can be recorded.

For operations to record the title and the date, there has been proposed a VTR with a camera integrated therein having a so-called superimpose function in which a title created, for example, by a printing operation is shot by means of a video camera so as to stored beforehand and the image thus shot in a memory disposed in the camera. After an operation to shoot an object is started, the title stored in the memory is read out so as to be inserted or superimposed onto a screen thus produced. However, in using such an apparatus each time the operator conducts a shooting operation, it is necessary to create a title, which hence imposes the problem of preparing a title production on the operator.

In addition, in the case where the operator selects a desired title from a plurality of titles thus produced and stored in the memory, it has been conventionally required to operate three kinds of buttons including a forward (+) button, a reverse (−) button, and a decision button, for example; consequently, the title selection has been an extremely difficult operation.

Furthermore, conventionally, in the case when shooting of an object, a predetermined voice is desired to be recorded together with an image of the object on a recording medium, it is required that a tape recorder is used to effect a playback operation to reproduce a predetermined voice recorded beforehand on a tape so as to collect the reproduced voice by means of a microphone disposed in the video tape recorder, thereby recording the voice together with the image thus shot. In consequence, in addition to the video tape recorder, a tape recorder is required to be prepared to generate the voice. This is inconsistent. Moreover, there has been a problem that during an operation to collect the voice or tone produced through a playback operation of the tape recorder, an environmental noise is also recorded on the recording medium.

SUMMARY OF THE INVENTION

It is therefore an object of the present invention to provide a video tape recorder with a camera integrated therein and a video camera each capable of recording a title and a predetermined voice associated therewith on a recording medium when an object is shot.

According to the present invention, there is provided a video tape recorder in which a video signal obtained by imaging an object and an audio signal gathered for the imaging operation are recorded on a recording medium. There is a record means for recording the video signal and the audio signal on the recording medium and title image data store means for storing therein a plurality of title image data items. Selection data input means is operated by an operator to input an indication of a title image data item selected from the plural title image data items stored in the title image data store means. Control means are used for controlling said record means and said title image data store means, said control means being responsive to an indication supplied from the operator by use of said selection data input means for reading out a selected title image data item from said title image data store means so as to deliver the title image data to said record means together with the video signal developed by imaging the object, thereby enabling the title image data item to be recorded on the recording medium together with the video signal developed by imaging the object.

In addition, according to the present invention, there is provided a video camera which produces a video signal obtained by imaging an object and an audio signal gathered for the imaging operation comprising title image data store means for storing therein a plurality of title image data items. Selection data input means are operated by an operator to input an indication of a title image data item selected from the plural title image data items stored in the title image data store means, and control means are used for controlling said title image data store means. Said control means being responsive to an indication supplied from the operator by use of said selection data input means for reading out a selected title image data item from said title image data store means, thereby enabling the title image data item to be produced together with the video signal developed by imaging the object.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
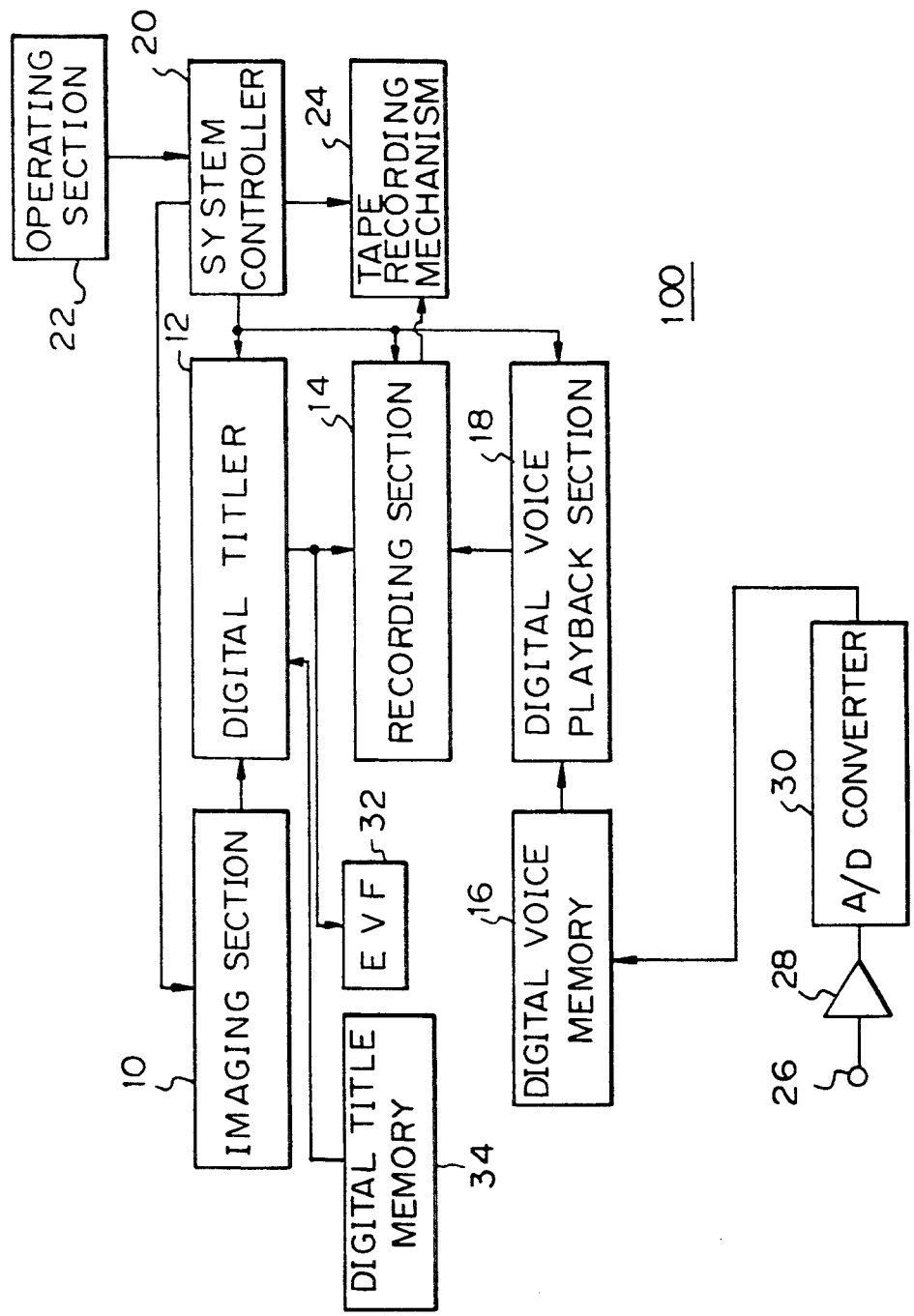
FIG. 1 is a schematic block diagram showing an embodiment of a video tape recorder, with a camera integrated therein according to the present invention.

Referring now to the drawings, description will be given of an embodiment according to the present invention.

FIG. 1 shows an embodiment in which the present invention is applied to a video tape recorder including a camera integrated therewith. In this embodiment, a video tape recorder having a camera integrated therewith 100 hias an imaging function, an image recording function, and a playback function. The video tape recorder 100 comprises a digital title memory 34 for storing therein a plurality of titles and a digital voice memory 16 in which voice or audio data associated with the titles are stored. In this apparatus, a title selected in response to a title selection conducted by the operator from the titles stored in the digital title memory 34 is inserted into an imaged screen; furthermore, a music piece or a voice associated with the title is read from the voice data stored in the digital voice memory 16 so as to be recorded on a video tape together with the title at the same time.

There is disposed an imaging section 10 including a lens of an optical system and a solid-state imaging device, not shown, such as a charge-coupled device such that in response to control signals from a system controller 20, an optical image of an object focused through the lens is converted into a video signal so as to produce a composite video signal of the standard color television format including a luminance signal, a color difference signal, and a synchronizing signal, which is then transmitted to a digital titler section 12.

The digital titler 12 is connected to the digital title memory 34 storing therein fixed titles in the form of digital data, for example, "Wedding Ceremony", "Athletic Meeting", "Children's Day", "Christmas Party", and "the New Year" associated with occasions where objects and object scenes are to be frequently shot.

Moreover, the digital titler section 12 is connected to the imaging section 10, a recording section 14, and the system controller 20. Based on a title indicate signal received from the system controller 20, the digital titler 12 reads out an indicated title from the plural fixed titles stored in the digital title memory 34 such that a signal of the title is mixed with the video signal supplied from the imaging section 10 and that the resultant signal is sent to the recording section 14, thereby displaying the title superimposed onto the picture represented by the video signal. The mixed signal from the digital titler 12 is also delivered to an electronic viewfinder, EVF 32 so that the title is superimposed onto the imaged picture displayed on the electronic viewfinder 32.

In the digital voice memory 16, there are stored appropriate music pieces associated with the respective titles stored in the digital title memory 34, for example, "Seikurabe (Japanese Children's song)" for the fixed title "Children's day", and "Jingle Bells" for the fixed title "Christmas party".

The video tape recorder 100 includes a microphone 26, an amplifier 28 for amplifying an audio signal supplied from the microphone 26, and an analog-to-digital, AD converter 30 for converting the audio signal from the amplifier 28 into a digital signal. The analog-to-digital converter 30 produces an output, which is connected to the digital voice memory 16 and the recording section 14.

A digital voice playback section 18 is responsive to a control signal from the system controller 20 so as to read out specified data from the music pieces or voice or audio data stored in the digital voice memory 16, thereby effecting a playback on the data. The reproduced signal is sent to the recording section 14.

The recording section 14 modifies the video signal received from the digital titler 12 and the audio signal supplied from the digital voice playback section 18 into a signal to be recorded on a video tape and delivers the obtained signal to a tape recording mechanism 24. The tape recording mechanism 24 includes a tape drive mechanism such as a rotary head cylinder and a motor necessary to record the video and audio signal on a video tape and a tape install section in which the video cassette tape is to be mounted. The mechanism 24 is driven according to a control signal supplied from the system control section 20.

The recording section 14 is responsive to a control signal delivered from the system control section 20 to supply the tape drive mechanism 24 with the video signal which is generated by the imaging section 10 and which is mixed with a fixed title in the digital titler 12. The tape recording mechanism 24 records the video signal via a video head onto a video track of a video cassette tape installed in the tape install section. In addition, a recording signal of the voice fed from the digital voice playback section 18 is recorded via an audio signal recording head onto an audio track of the video cassette tape.

The system control section 20 is advantageously constituted with a microcomputer, CPU and is connected to the imaging section 10, the operating section 22, the tape recording section 24, and the digital voice playback section 18. The system controller 20 supplies the respective sections of the video tape recorder 100 with various control signals depending on the connection states of the switches disposed in the operator's console 22.

Figure 2:
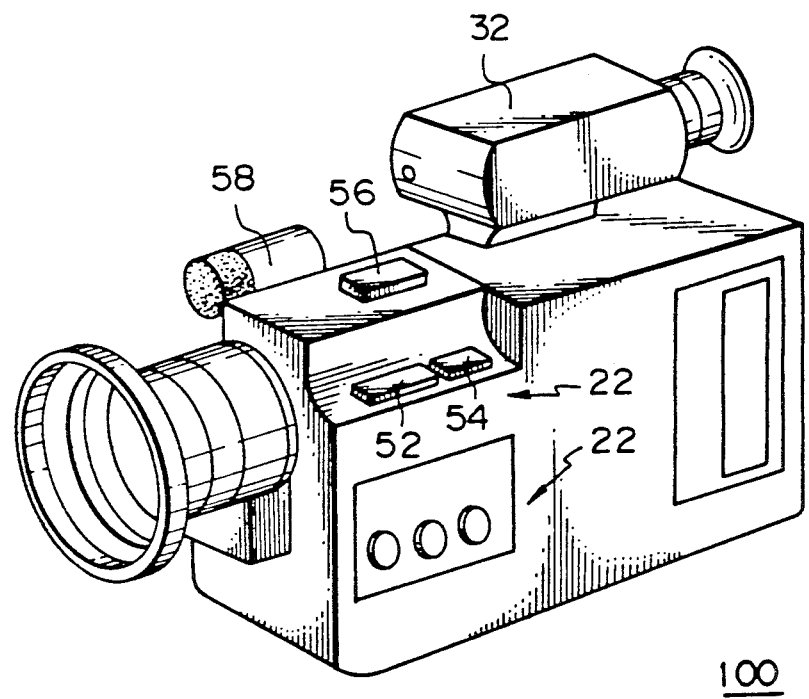
FIG. 2 is a perspective view of an appearance of the apparatus of FIG. 1.

The operating section 22 is arranged in an outer surface of a casing of the video tape recorder 100 with a camera integrated therein as shown in FIG. 2 and includes a record switch for inputting indications of initiation and termination of the recording operation, a title select switch 52 for selecting a fixed title stored in the digital memory of the digital titler 12, and a title record switch 54 for recording a selected title.

Incidentally, the title select switch 52 has a function to indicate two operations. Namely, a first function is employed to supply an indication to output the menu of a fixed title from the digital memory of the digital titler 12 onto the electronic viewfinder 32, whereas a second function is adopted to select a title from the title menu displayed on the electronic viewfinder 32.

These switches are operated by the operator who effects a shooting operation.

The electronic viewfinder 32 has a small-sized Braun tube so as to receive a video signal supplied from the imaging section 10 via the digital titler 12 or a video signal mixed with a fixed title from the digital titler 12, thereby displaying a resultant picture.

Next, description will be given of operatios of the video tape recorder 100 with a camera integrated therein.

Figure 3:
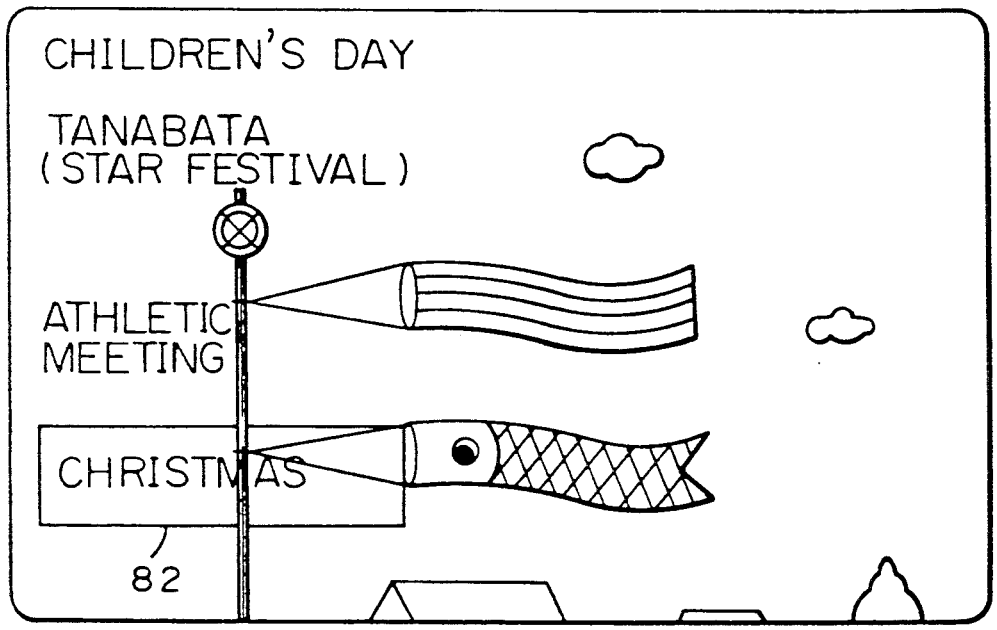
FIG. 3 is a diagram schematically showing an example of a display of an electronic view-finder employed in a title selection in the apparatus of FIG. 1.
Figure 4:
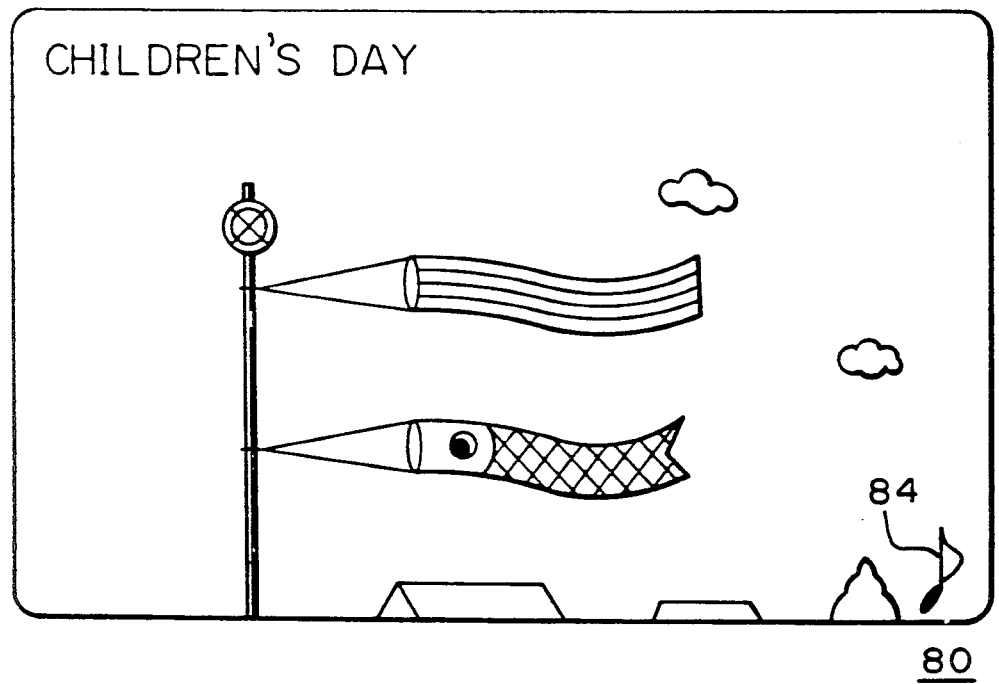
FIG. 4 is a schematic diagram showing an example of a display of an electronic viewfinder after a shooting operation is started in the apparatus of FIG. 1.

Referring to FIGS. 3 and 4, there is shown an example of the case where a title and a music piece associated therewith are inserted into an imaged picture so as to record a resultant image on a recording medium.

When the operator turns the main power of the video tape recorder 100 on, the system control section 20 delivers a control signal to the imaging section 10, which then converts an optical image of an object focused through the lens into a video signal, produces therefrom a composite video signal conforming to the standard color television format, and then supplies the resultant video signal to the digital titler 12. The composite video signal is transmitted via the digital titler 12 to the recording section 14 and to the electronic viewfinder 32. This operation is continuously achieved until the main power is turned off regardless of the connection state of the recording switch 56.

As shown in FIG. 3, when the title selection switch 52 of the operator's panel 22 is set to ON by the operator, the system controller 20 sends a control signal to the digital titler 12 so as to call for a menu of fixed titles stored in the digital memory of the digital titler 12, thereby displaying the menu on a display screen 80 of the electronic viewfinder 32. In this situation, a cursor 82 is indicated at either one of the fixed titles to enable the operator or user to select a title. Thereafter, when the operator activates the title selection switch 52, the sytem control section 20 shifts the cursor 82 downward by a title line on the display screen 80. In consequence, the user operates the switch 52 until a title to be inserted into the imaged screen appears on the screen and selected. For example, in the case where the operator desires to select a title "Children's Day", the switch 52 is operated until the cursor 82 comes to the position of the "Children's Day".

When the record switch 56 is activated, the system controller 20 controls the recording section 14 and the tape recording mechanism 24 to initiate a recording operation of the image onto the video cassette tape.

When the title record switch 54 is additionally operated, the system controller 20 sends a control signal to the digital titler 12, which inturn converts digital data of the title "Children's day" thus selected into analog data through a digital-to-analog conversion so as to mix the converted recording signal with a video signal supplied from the imaging section 10. The mixed video signal is fed via the recording section 14 to the tape recording mechanism 24 so as to be recorded via the video head onto a video track of a video cassette tape installed in the tape mount section.

In this situation, the system controller 20 also supplies a control signal to the digital voice playback section 18, which then reads out data of a music piece associated with the title "Children's Day" from the data of music pieces stored in the digital voice memory 16 such that the obtained data undergoes a playback operation to produce an audio signal to be transmitted to the recording section 14. The audio signal is converted into a recording signal in the recording section 14 and is then sent to the tape recording mechanism 24 so as to be recorded on an audio track of the video cassette tape mounted in the tape install section.

Incidentally, the title is recorded on the video cassette tape so as to be displayed on the screen before the music piece associated therewith is finished, so that the recording of the title is completed when the music performance is terminated. In addition, as shown in FIG. 4, while a title and a music piece are being recorded on a tape, the title is supplied to the electronic viewfinder 32 so that a musical note symbol 84 indicating the performance of the music piece is displayed on the display screen 80. A voice or tone of the music piece is delivered to an earphone terminal, not shown, which enables the user to confirm the playback of the music piece.

As described above, a title and a music piece corresponding thereto are recorded on a video cassette tape together with a image signal.

In short, the video tape recorder 100 having a camera integrated therewith according to the present invention is provided with the digital title memory 34 for storing therein a plurality of fixed titles and a digital voice memory 16 in which music pieces corresponding to the respective fixed titiles or voices beforehand stored in association therewith are stored. When the title selection switch 52 and the title recording switch 54 are operated for connections thereof, a title menu is displayed on the electronic viewfinder 32; thereafter, when the operator selects a title of the menu, a music piece or a voice associated with the selected title is recorded on a video cassette tape together with the title at the same time.

In consequence, while the operator is recording an object by visually checking an image thereof through the electronic viewfinder 32, through an operation to activate the title selection switch 52 and the title recording switch 54, a desired title can be easily inserted into an obtained scene in which the title is to be displayed; furthermore, a music piece or a voice associated with the selected title is recorded on a video cassette tape together with the title at the same time.

Incidentally, when the recording of the music piece or the voice associated with the title is completed in the video tape recorder 100 having a camera integrated therewith according to the present invention, there is naturally conducted a normal recording by means of an external microphone 58 mounted on the video tape recorder 100; moreover, while a title is being recorded on a tape, it is possible to simultaneously effect the recording of a music piece or a voice and the recording operation through the external microphone 58.

In addition, in the video tape recorder 100 according to the present invention, when a title is selected, a music piece or a voice associated with the selected title is recorded on a video cassette tape at the same time; moreover, it is also possible to provide a selecting function so as to record only the title or only the musicpiece or voice on the recording medium.

Furthermore, if the video tape recorder 100 according to the present invention is provided with the conventional superimpose function described above, namely, a function in which a title beforehand shot by the operator and recorded in a memory is inserted into a produced image screen, it is possible to implement a camera having a broader applicability.

Moreover, according to this embodiment, although the digital title memory 34 and the digital voice memory 16 are installed in the video tape recorder 100 with a camera integrated therein, the apparatus may also be configured such that the apparatus is provided with a connector section for connecting an external memory to the apparatus so as to store the plural fixed titles and voice data associated therewith respectively stored in the digital title memory 34 and the digital voice memory 16 and that the external memory is then connected to the connector section, thereby developing the function above.

Although the description of the present invention has been given with reference to the embodiment in an example of a video tape recorder 100 with a camera integrated therein, the present invention is applicable to, in addition to the VTR having an integrated camera, a video camera of a separated type, a disk camera, and other cameras.

According to the present invention, since the video tape recorder 100 with a camera integrated therein is provided with title image data store means for storing therein image data of a plurality of titles and voice data store means in which voice data associated with these titles are stored, it is possible for the user to insert a desired title through a simple operation when a video signal is recorded; furthermore, the voice can be inserted together with the title.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A video tape recorder integrated with a camera in which a video signal attained by shooting an object and an audio signal captured are recorded on a recording medium comprising:

recording means for recording the video signal and the audio signal on the recording medium;

title image data store means for storing therein a plurality of prestored title image data items displayable on a menu;

selection data input means operated by an operator to input an indication of a title image data item selected from the plural prestored title image data items stored in the title image data store means; and control means for controlling said recording means and said title image data store means, said control means being responsive to an indication supplied from the operator, by use of said selection data input means for reading out a selected title image data item from said title image data store means so as to deliver the title image data to said recording means together with the video signal developed by imaging the object, thereby enabling the title image data item to be recorded on the recording medium together with the video signal developed by imaging the object.

2. A video tape recorder in accordance with claim 1 further comprising:

audio data store means for storing therein a plurality of audio data items to be associated with a prestored specific title, said control means responsive to an indication supplied from the operator by use of said selection data input means for reading out a selected title image data item from said title image data store means and for reading out one of the audio data items associated with the selected title image data so as to deliver the title image data item and the audio data item to said recording means together with the video signal developed by imaging the object, thereby enabling the title image data item and the audio data item to be recorded on the recording medium together with the video signal developed by imaging the object.

3. A video tape recorder in accordance with claim 1 further comprising:

a viewfinder for displaying an image associated with the video signal developed by imaging the object, said control means supplying said viewfinder with the title image data item together with the video signal developed by imaging the object, thereby enabling the title image data item to be displayed on said viewfinder together with the video signal developed by imaging the object.

4. A video camera for producing a video signal obtained by imaging an object and an audio signal captured for the imaging operation comprising:

title image data store means for storing therein a plurality of prestored title image data items displayable on a menu;

selection data input means operated by an operator to input an indication of a title image data item selected from the plural title image data items stored in the title image data store means; and control means for controlling said title image data store means; and said control means being responsive to an indication supplied from the operator by use of said selection data input means for reading out a selected title image data item from said title image data store means, thereby enabling the title image data item to be produced together with the video signal developed by imaging the object.

5. A video camera in accordance with claim 4 further comprising:

audio data store means for prestoring therein a plurality of audio data item to be associated with a prestored title, said control means being responsive to an indication supplied from the operator by use of said selection data input means for reading out a selected title image data item from said title image data store means and for reading out one of the audio data items associated with the selected title image data, thereby enabling the title image data item and the audio data item to be produced together with the video signal developed by imaging the object.

6. A video camera in accordance with claim 4 further comprising:

a viewfinder for displaying an image associated with the video signal developed by imaging the object, said control means supplying said viewfinder with the title image data item together with the video signal developed by imaging the object, thereby enabling the title image data item to be displayed on said viewfinder together with the video signal developed by imaging the object.

7. A video tape recorder in accordance with claim 1, further including a menu for displaying the prestored title images so that an operator can select a specific title applicable to the object being shot.

8. A video camera in accordance with claim 4, further including a menu for displaying the prestored title images so that an operator can select a specific title applicable to the object being shot.

9. A video tape recorder in accordance with claim 2, further including means for visually indicating audio data.

10. A video camera in accordance with claim 5 further including means for visually indicating audio data.

* * * * *